United States Patent
Amin-Sanayei

(10) Patent No.: US 6,734,264 B1
(45) Date of Patent: May 11, 2004

(54) CHAIN TRANSFER AGENT

(75) Inventor: Ramin Amin-Sanayei, Collegeville, PA (US)

(73) Assignee: Atofina Chemicals, Inc., Philadelphia, PA (US)

( * ) Notice: Subject to any disclaimer, the term of this patent is extended or adjusted under 35 U.S.C. 154(b) by 38 days.

(21) Appl. No.: 10/321,314

(22) Filed: Dec. 16, 2002

(51) Int. Cl.$^7$ .................................................. C08F 2/38
(52) U.S. Cl. ......................... 526/82; 526/208; 526/250; 526/254; 526/255
(58) Field of Search ............................... 526/207, 255, 526/250, 254, 82

(56) References Cited

U.S. PATENT DOCUMENTS

| | | | |
|---|---|---|---|
| 3,475,396 A | | 10/1969 | McCain et al. |
| 3,635,926 A | | 1/1972 | Gresham et al. |
| 4,391,940 A | * | 7/1983 | Kuhls et al. ................. 524/458 |
| 4,569,978 A | | 2/1986 | Barber ........................ 526/206 |
| 5,516,863 A | * | 5/1996 | Abusleme et al. .......... 526/206 |
| 2002/0147289 A1 | | 10/2002 | Amin-Sanayei et al. .... 526/255 |
| 2002/0198334 A1 | * | 12/2002 | Kaspar et al. ................. 526/78 |

* cited by examiner

*Primary Examiner*—Bernard Lipman
(74) *Attorney, Agent, or Firm*—William D. Mitchell

(57) ABSTRACT

Vinylidene fluoride polymers are produced by using a C3–C5 hydrocarbon as a chain transfer agent in the free radical polymerization process.

5 Claims, No Drawings

CHAIN TRANSFER AGENT

BACKGROUND OF THE INVENTION

This invention relates to the use of a C3–C5 hydrocarbon such as propane as a chain transfer agent in the preparation of fluoropolymers, especially to the free radical polymerization of vinylidene fluoride monomer optionally conducted in the presence of other fluorinated olefins.

Various efforts have been tried over the years to find a suitable chain transfer agent for such polymerizations, as disclosed in the background section of U.S. patent application Publication 2002/0147289 A1. For example, the emulsion polymerization at moderate pressure of vinylidene fluoride using fluorinated surfactant and, as a free-radical initiator. diisopropyl peroxydicarbonate (hereinafter referred to as IPP) is taught in U.S. Pat. No. 3,475,396. The same patent teaches that the amount of fluorinated surfactant necessary in the system can be reduced if a chain transfer agent is present in the reaction system. U.S. Pat. No. 4,569,978 discloses the use of trichlorofluoromethane (CFC-11) as a chain transfer agent to reduce or eliminate the discoloration and cavity formation phenomenon but this CFC is an ozone depleting material and its use is being, banned worldwide. U.S. Pat. No. 3,635,926 discloses an aqueous process for making tetralluoroethylene/fluorovinyl ether (TFE/FVE) copolymers in the presence of chain transfer agents such as hydrogen and methane in combination with CFCs and HCFCs. In this patent only perfiltoromonomers (mainly TFE) were considered and methane was the most preferred chain transfer agent since it exhibited a reasonable chain transfer activity in the polymerization of perfluoromonomers; however, high alkanes were reported to be too active to be used in polymerization due to undesired (slowing) effect on the polymerization rate.

The aforesaid Application 2002/0147289 discloses the use of ethane as a chain transfer agent in a free radical polymerization of vinylidene fluoride. However, higher alkanes, including propane, were reported to be too active to be used due to an undesired slowing effect on the polymerization rate.

In contrast to above disclosures regarding fluorinated monomers, it has surprisingly been found that the use of C3–C5 hydrocarbons such as propane as a chain transfer agent in the vinylidene fluoride polymerization process results, particularly in the case of vinylidene fluoride homopolymers, in a product with good color which resists discoloration at elevated temperatures. In fact, propane has been found to be about ten times as efficient as CFC-11 and about three times as efficient as ethane. Indeed, among all hydrocarbons, propane surprisingly provides the highest polymerization rate per initiator consumption at a given degree of polymerization. Propane is also inexpensive and non-hazardous.

SUMMARY OF THE INVENTION

In a process for the free radical polymerization of vinylidene fluoride monomer, optionally in the presence of other fluorinated olefins, this invention provides the improvement comprising the use of a C3–C5 hydrocarbon such as pentane, butane or, preferably, propane as the chain transfer agent. The amount of hydrocarbon can vary widely, but, in the case of propane, less is required than with previous agents such as ethane. The hydrocarbon can be added in batch or continuous feed, depending on the desired molecular weight distribution. The polymerization media normally comprises water or carbon dioxide (such as supercritical and/or liquid carbon dioxide). The preferred free radical initiators are di-n-propyl peroxydicarbonate or di-isopropyl peroxydicarbonate. In another preferred process aspect, vinylidene fluoride homopolymer is produced.

DETAILED DESCRIPTION

The manner of practicing the invention will now be generally described with respect to a specific embodiment thereof, namely polyvinylidene fluoride based polymer prepared in aqueous emulsion polymerization using propane as the chain transfer agent.

The polymers are conveniently made by an emulsion polymerization process, but suspension and solution processes may also be used. In an emulsion polymerization process, a stirred reactor is charged with deionized water and fluorinated surfactant and this initial charge is deoxygenated while agitated.

The reactor temperature is raised to the desired polymerization temperature, the predetermined amount of propane is introduced, and either vinylidene fluoride alone or a mixture of monomers such as vinylidene fluoride and hexafluoropropylene are fed to the reactor. The temperature of the reaction can vary depending on the characteristics of the initiator used, but is typically from about 30° to 130° C., preferably from about 50° to 110° C. Once the pressure in the reactor has reached the desired level, an initiator emulsion, made of a dispersion of either di-isopropyl peroxydicarbonate or di-n-propyl peroxydicarbonate in water, is charged to start the polymerization reaction. The polymerization pressure may vary, but typically will be within the range of about 20 to 50 atmospheres. Following the initiation of the reaction, the vinylidene fluoride or vinylidene/hexafluoropropylene mixture is continuously fed along with additional initiator to maintain the desired pressure. Once the desired amount of polymer has been reached in the reactor, the monomer feed(s) will be stopped, but initiator feed is continued to consume residual monomer(s). In order to avoid compositional drifts in case of copolymers, after reactor pressure drops to a given level, a shot of vinylidene fluoride is added to bring the vinylidene fluoride concentration up. This step may be repeated more than one time depending on the hexafluoropropylene concentration in the reactor. When the reactor pressure is low enough, about 300 psig, the initiator charge is stopped and after a delay time the reactor is cooled. The unreacted monomer(s) and propane are vented and the latex is recovered from the reactor. The polymer may then be isolated from the latex by standard methods, such as acid coagulation, freeze thaw or shear coagulation.

Although the process of the invention has been generally illustrated with respect to the polymerization of vinylidene fluoride homopolymer, one of skill in the art will recognize that analogous polymerization techniques can be applied to the preparation of copolymers of vinylidene fluoride with coreactive monomers fluorinated or unfluorinated such as hexafluoropropylene and the like. Analogous techniques can also be applied using propane as a chain transfer agent in the polymerization of other fluorinated polymers, both homopolymers and copolymers.

Surfactants suitable for use in the polymerization are well known in the art and are typically water soluble halogenated surfactants, especially fluorinated surfactants such as the ammonium, substituted quaternary ammonium or alkali metal salts of perfluorinated or partially fluorinated alkyl carboxylates, the perfluorinated or partially fluorinated monoalkyl phosphate esters, perfluorinated or partially fluorinated alkyl ether or polyether carboxylates, the perfluorinated or partially fluorinated alkyl sulfonates, and the perfluorinated or partially fluorinated alkyl sulfates. Some specific, but not limiting examples are the salts of the acids described in the U.S. Pat. No. 2,559,752 of the formula X $(CF_2)_n COOM$, wherein X is hydrogen or fluorine, M is an alkali metal, ammonium, substituted ammonium (e.g., alkylamine of 1 to 4 carbon atoms), or quaternary ammonium ion, and n is an integer from 6 to 20; sulfuric acid esters of polyfluoroalkanols of the formula X $(CF_2)_n CH_2 OSO_3 M$, where X and M are as above; and salts of the acids of the formula $CF_3(CF_2)_n(CX_2)_m SO_3 M$, where X and M are as above; n is an integer from 3 to 7, and m is an integer from 0 to 2, such as in potassium perfluoroctyl sulfonate. The use of a microemulsion of perfluorinated polyether carboxylate in combination with neutral perfluoropolyether in vinylidene fluoride polymerization can be found in EP0816397A1 and EP722882. The surfactant charge is from 0.05% to 2% by weight on the total monomer weight used, and most preferably the surfactant charge is from 0.1% to 0.2% by weight.

Paraffin antifoulant is an optional additive, and any long-chain, saturated, hydrocarbon wax or oil may be used for this purpose. Reactor loadings of the paraffin typically are from 0.01% to 0.3% by weight on the total monomer weight used.

The propane may be added all at once at the beginning of the reaction, or it may be added in portions, or continuously throughout the course of the reaction. The amount of propane added as a chain transfer agent and its mode of addition depends on the desired molecular weight characteristics, but is normally used in an amount of from about 0.5% to about 5% based on total monomer weight used, preferably from about 0.5% to about 2%.

It has been found that substitution of methane for propane shows no reduction in molecular weight (MW), that is, that it has no chain transfer effect in polyvinylidene fluoride polymerizations. When ethane is used, the polymerization rate was significantly slower than that of propane, as a result of which the initiator consumption was higher which in turn will have a negative impact on product color. While butane and pentane give satisfactory results, propane surprisingly results in the fastest polymerization rates.

The reaction can be started and maintained by the addition of any suitable initiator known for the polymerization of fluorinated monomers including inorganic peroxides, "redox" combinations of oxidizing and reducing agents, and organic peroxides. Examples of typical inorganic peroxides are the ammonium or alkali metal salts of persulfates, which have useful activity in the 65° C. to 105° C. temperature range. "Redox" systems can operate at even lower temperatures and examples include combinations of oxidants such as hydrogen peroxide, t-butyl hydroperoxide, cumene hydroperoxide, or persulfate, and reductants such as reduced metal salts, iron (11) salts being a particular example, optionally combined with activators such as sodium formaldehyde sulfoxylate, metabisulfite, or ascorbic acid. Among the organic peroxides which can be used for the polymerization are the classes of dialkyl peroxides, diacylperoxides, peroxyesters, and peroxydicarbonates. Exemplary of dialkyl peroxides is di-tbutyl peroxide, of peroxyesters are t-butyl peroxypivalate and t-amyl peroxypivalate, and of peroxydicarbonate, and di(n-propyl) peroxydicarbonate, diisopropyl peroxydicarbonate, di(sec-butyl) peroxydicarbonate, and di(2-ethylhexyl) peroxydicarbonate. The use of diisopropyl peroxydicarbonate for vinylidene fluoride polymerization and copolymerization with other fluorinated monomers is taught in U.S. Pat. No. 3,475,396 and its use in making vinylidene fluoride/hexafluoropropylene copolymers is further illustrated in U.S. Pat. No. 4,360,652. The use of di(n-propyl) peroxydicarbonate in vinylidene fluoride polymerizations is described in the Published Unexamined Application (Kokai) JP 58065711. The quantity of an initiator required for a polymerization is related to its activity and the temperature used for the polymerization. The total amount of initiator used is generally between 0.05% to 2.5% by weight on the total monomer weight used. Typically, sufficient initiator is added at the beginning to start the reaction and then additional initiator may be optionally added to maintain the polymerization at a convenient rate. The initiator may be added in pure form, in solution, in suspension, or in emulsion, depending upon the initiator chosen. As a particular example, peroxydicarbonates are conveniently added in the form of an aqueous emulsion.

The term "vinylidene fluoride polymer" used herein for brevity includes both normally solid, high molecular weight homopolyiners and copolymers within its meaning. Such copolyiners include those containing at least 50 mole percent of vinylidene fluoride copolymerized with at least one comonomer selected from the group consisting of tetrafluoroethylene, trifluoroethylene, chlorotrifluoroethylene, hexafluoropropene, vinyl fluoride, pentafluoropropene, perfluoromethyl vinyl ether, perfluoropropyl vinyl ether and any other monomer that would readily copolymerize with vinylidene fluoride. Particularly preferred are copolymers composed of from at least about 70 and up to 99 mole percent vinylidene fluoride, and correspondingly from 1 to 30 percent tetrafluoroethylene, such as disclosed in British Patent No. 827,308; and about 70 to 99 percent vinylidene fluoride and 1 to 30 percent hexafluoropropene (see for example U.S. Pat. No. 3,178,399); and about 70 to 99 mole percent vinylidene fluoride and 1 to 30 mole percent trifluoroethylene. Terpolymers of vinylidene fluoride, hexafluoropropene and tetrafluoroethylene such as described in U.S. Pat. No. 2,968,649 and terpolymers of vinylidene fluoride, trifluoroethylene and tetrafluoroethylene are also representatives of the class of vinylidene fluoride copolymers which can be prepared by the process embodied herein.

I claim:

1. In a process for the free radical polymerization of vinylidene fluoride monomer, the improvement consisting essentially of using a C3–C5 hydrocarbon as a chain transfer agent.

2. In a process for the free radical polymerization of vinylidene fluoride monomer, the improvement consisting essentially of using at least about 0.5 weight %, based on the total monomer weight, of propane as a chain transfer agent.

3. In a process for the free radical polymerization of vinylidene fluoride/hexafluoropropylene comonomer mixtures, the improvement consisting essentially of using at least about 0.5 weight %, based on the total monomer weight, of propane as a chain transfer agent.

4. The of process claim 1 wherein at least one fluorinated olefin comonomer is present.

5. The process of claim 4 wherein the C3–C5 hydrocarbon is propane in an amount of at least about 0.5 weight %, based on the total monomer weight.

* * * * *